US006477708B1

(12) United States Patent
Sawa

(10) Patent No.: US 6,477,708 B1
(45) Date of Patent: Nov. 5, 2002

(54) BIDIRECTIONAL COMMUNICATION SYSTEM, CLIENT TERMINAL, CLIENT MANAGEMENT SERVER, AND BROADCAST SERVER

(75) Inventor: Hirofumi Sawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/054,528

(22) Filed: Apr. 3, 1998

(30) Foreign Application Priority Data

Apr. 4, 1997 (JP) .............................................. 9-086803

(51) Int. Cl.[7] .............................................. H04N 7/173
(52) U.S. Cl. ........................ 725/116; 725/96; 713/150; 713/168; 348/14.08
(58) Field of Search ................................ 725/1, 91, 93, 725/94, 114, 116, 6, 95, 96; 348/14.08, 14.09; 709/209, 219, 229, 226; 713/150, 168, 200, 202; H04N 7/16, 7/173

(56) References Cited

U.S. PATENT DOCUMENTS

| 5,208,665 A | * | 5/1993 | McCalley et al. .......... 725/119 |
| 5,471,318 A | * | 11/1995 | Ahuja et al. ................. 358/400 |
| 5,508,731 A | * | 4/1996 | Kohorn ........................ 725/24 |
| 5,689,553 A | * | 11/1997 | Ahuja et al. ............ 379/201.01 |
| 5,742,772 A | * | 4/1998 | Sreeman ...................... 709/226 |
| 5,790,677 A | * | 8/1998 | Fox et al. ...................... 705/78 |
| 5,850,442 A | * | 12/1998 | Muftic ........................ 705/65 |
| 6,181,679 B1 | * | 1/2001 | Ashton et al. ............... 370/244 |
| 2001/0004767 A1 | * | 6/2001 | Gordon et al. ................. 725/87 |
| 2001/0011298 A1 | * | 8/2001 | Gosling et al. ............. 709/203 |

* cited by examiner

Primary Examiner—Andrew Faile
Assistant Examiner—Andrew Y. Koenig
(74) Attorney, Agent, or Firm—Staas & Haley LLP

(57) ABSTRACT

A bidirectional communication system which provides a wide variety of communication services to meet the needs of broadcast audiences. Each client terminal sends a service request message over a communications network and receives authorization, and after that, it transmits and receives the video information. A client management server receives service request messages from clients and executes a two-stage authentication process to grant authorization to them. A video data communication server transmits and receives the video information to/from the requesting clients when their identity has successfully been authenticated.

21 Claims, 13 Drawing Sheets

BIDIRECTIONAL COMMUNICATION SYSTEM, CLIENT TERMINAL, CLIENT MANAGEMENT SERVER, AND BROADCAST SERVER

BACKGROUND OF THE INVENTION

1. Field of the Invention

The present invention relates to a bidirectional communication system, client terminals, a client management server, and a broadcast server. More particularly, the present invention relates to a bidirectional communication system which offers bidirectional communication services allowing video information including image and voice data to be transferred between clients (e.g., broadcast audiences) and a broadcast server providing broadcast programs. Further, the present invention relates to: a client terminal which performs bidirectional communication with a broadcast server to transfer video information including image and voice data; a client management server which manages clients in a bidirectional communication system delivering video information including image and voice data; and a broadcast server which performs bidirectional communication with client terminals to transfer video information including image and voice data.

2. Description of the Related Art

There is a category of broadcast programs which is specialized in record and CD music and features a short chat given by a disc jockey in every transitional period for changing discs. Many broadcast stations are offering such music programs today, and they are well accepted by a wide range of listeners. While it is a typical style, in this particular broadcast programs, that a regular speaker (or speakers) prepares appropriate topics to proceed the program, he/she occasionally makes an interview with some listeners during the program, mainly by using telephone. Broadcast stations also provide for facsimile terminals, in addition to telephone sets, to collect opinions and information from many listeners, when the program necessitates such a research.

The above methods of gathering information and opinions are not always satisfactory for individual listeners, and there is still room for improvement to meet their true needs. This is because of the limited capabilities of the conventional communication facilities used to link between listeners and broadcast stations. That is, the existing facilities only allow one-way or two-way voice communication or one-way still image transfer, which may not always be a sufficient vehicle for some listeners to convey their information.

For example, some listeners may be weak in putting their thoughts into words. Interviews with those listeners would exhibit some jerkiness, when the interviewer urged them to describe something that has a complicated structure and/or movement. While the majority listeners expect those broadcast programs to be easy and refreshing, the jerkiness of interviews could cause some adverse effect on their expectations.

In recent years, the multimedia communications technologies have been developed, with the aim of providing a unified transmission medium to deliver different types of information including voice, still pictures, and motion video. To meet the broadcast listeners' needs and to promote their participation in broadcast programs, it is a strong demand to develop an advanced communication system in this area, taking advantage of today's multimedia communications technologies.

SUMMARY OF THE INVENTION

Taking the above into consideration, an object of the present invention is to provide a bidirectional communication system which offers a wide variety of communication services to meet the needs of broadcast audiences.

Further, another object of the present invention is to provide a client terminal which offers a wide variety of communication services to meet the needs of broadcast audiences.

Moreover, still another object of the present invention is to provide a client management server which manages a wide variety of communication services to meet the needs of broadcast audiences.

Furthermore, still another object of the present invention is to provide a broadcast server which offers a wide variety of communication services to meet the needs of broadcast audiences.

To accomplish the above objects, according to the present invention, there is provided a bidirectional communication system that performs bidirectional communication of video information including image and voice data. This bidirectional communication system comprises: a plurality of client terminals, each of which transmits and receives the video information after sending a first and second service request messages over a communications network and having been granted authorization through a first and second authentication processes for the first and second service request messages, respectively; a broadcast server comprising a video data communication server which transmits and receives the video information to and from the client terminal of a requesting client whose identity has been successfully authenticated through the second authentication process, the video data communication server initiating the second authentication process by sending an authentication request message over the communication network in response to the second service request from the requesting client terminal; and a client management server to perform the first authentication process in response to the first service request message from the requesting client terminal, and to perform the second authentication process in response to the authentication request message from the video data communication server.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
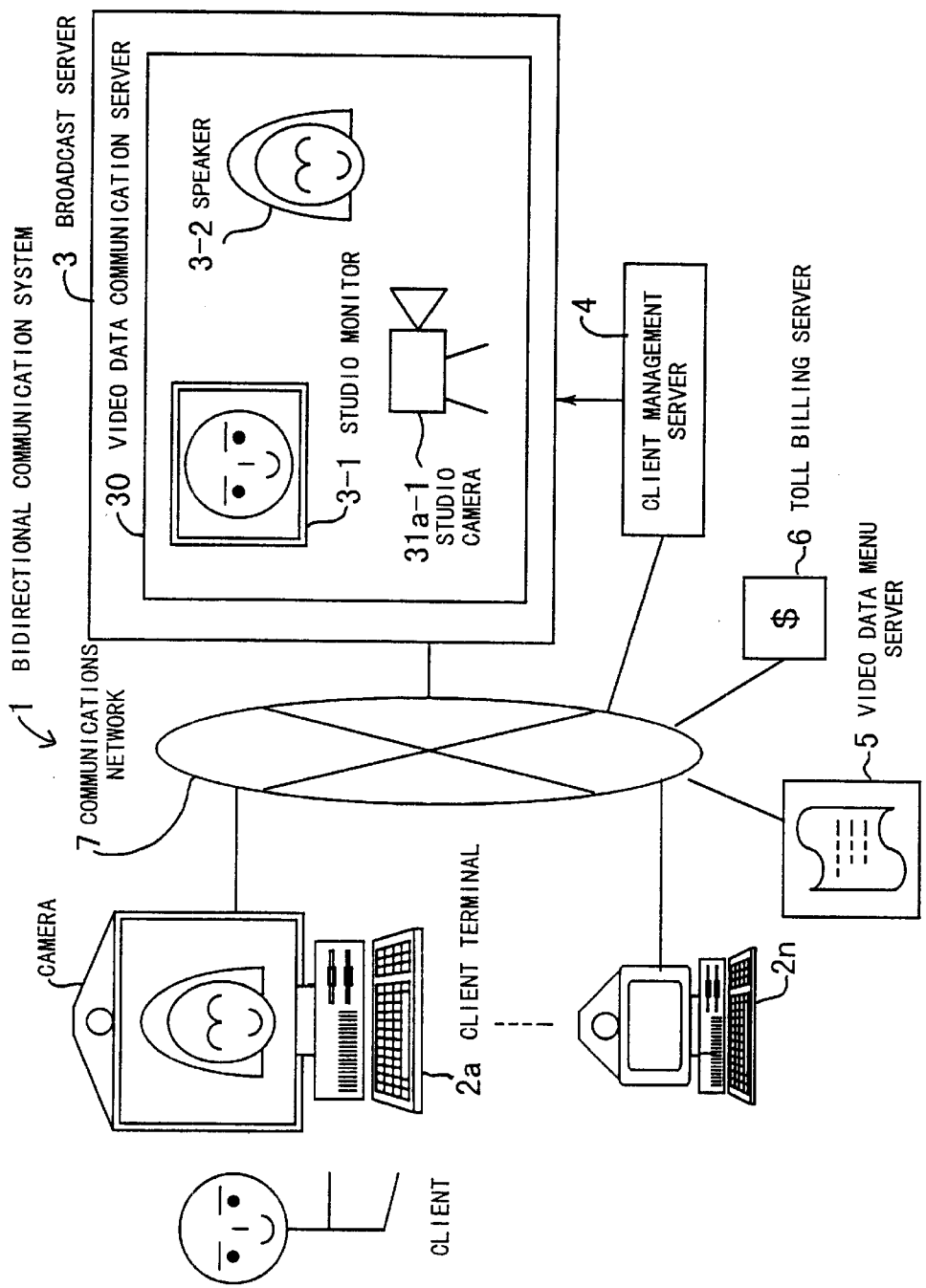
FIG. 1 is a conceptual view of a bidirectional communication system of the present invention.

Embodiments of the present invention will be described below with reference to the accompanying drawings. FIG. 1 is a conceptual view of a bidirectional communication system of the present invention.

A bidirectional communication system 1 comprises: client terminals 2a to 2n used by clients (e.g., broadcast audience), a client management server 4 which manages the clients, a broadcast server 3 disposed in a broadcast station (e.g., FM stations) to provide broadcast programs, and a communications; network 7 such as an Internet-based network or other networks having IP packet routing capabilities. Further, a video data menu server 5 and a toll billing server 6 are connected to the communications network 7, and a video data communication server 30 is employed in the broadcast server 3.

The client terminals 2a to 2n send service request messages to the broadcast server 3 across the communications network 7. Each service request message contains data to identify the requesting client, the client terminal address, and other related information. After being authorized through an appropriate authentication process, the client terminals are allowed to send their own video information to the broadcast server 3, as well as receiving video information from the broadcast server 3.

The client terminals 2a to 2n may actually be personal computers or workstations each equipped with a camera, a microphone, and a loudspeaker. Browser applications and other appropriate software programs have been installed in them to provide required functionalities. Videophones and videoconference terminals can also serve as the client terminals 2a to 2n. The client management server 4 performs a client authentication process, each time it receives a service request message from the client terminals 2a to 2n. It also manages each client's entry to the bidirectional communication system.

Suppose, for example, that the communications network 7 is an Internet-based network. In this case, an Internet service provider would work as the client management server 4. They support Internet access by the clients, thus allowing the clients to reach the bidirectional communication service. When the identity of the requesting client is authenticated by the client management server 4, the video data communication server 30 delivers video data from the broadcast server 3 to the relevant client terminal, as well as receiving video data from the terminal.

FIG. 1 shows a specific situation where the client's face is displayed on a studio monitor 3-1 in the video data communication server 30, while, on the client terminal 2a, the client can see the face of a speaker 3-2 captured by a studio camera 31a-1. In this way, the two parties communicate with each other. Here, the speaker 3-2 can switch his/her monitor screen to another view by manipulating an operation console (not shown) which is employed in connection with the studio monitor 3-1. The video data menu server 5 supplies the client terminals 2a to 2n with a video data menu, related to the video information, such as a list of broadcast stations which provides video programs. The toll billing server 6 controls toll billing processes. More specifically, the toll billing server 6 starts accumulation of a toll when each communication session with the client terminals 2a to 2n is initiated, and ends the accumulation when the communication session is terminated. This toll billing server 6 also issues "tickets" to the client terminals 2a to 2n. This ticket contains some data to identify the client terminals, including each client's identification number, password, or both. The issued tickets serve as a book of coupons that enables the clients to make access to a desired video information provider (i.e., broadcast server 3).

In the illustrated system, the video data menu server 5 and the toll billing server 6 are connected to the communications network 7 separately from the broadcast server 3. As an alternative configuration, they can be employed as integral part of the broadcast server 3.

Figure 2:
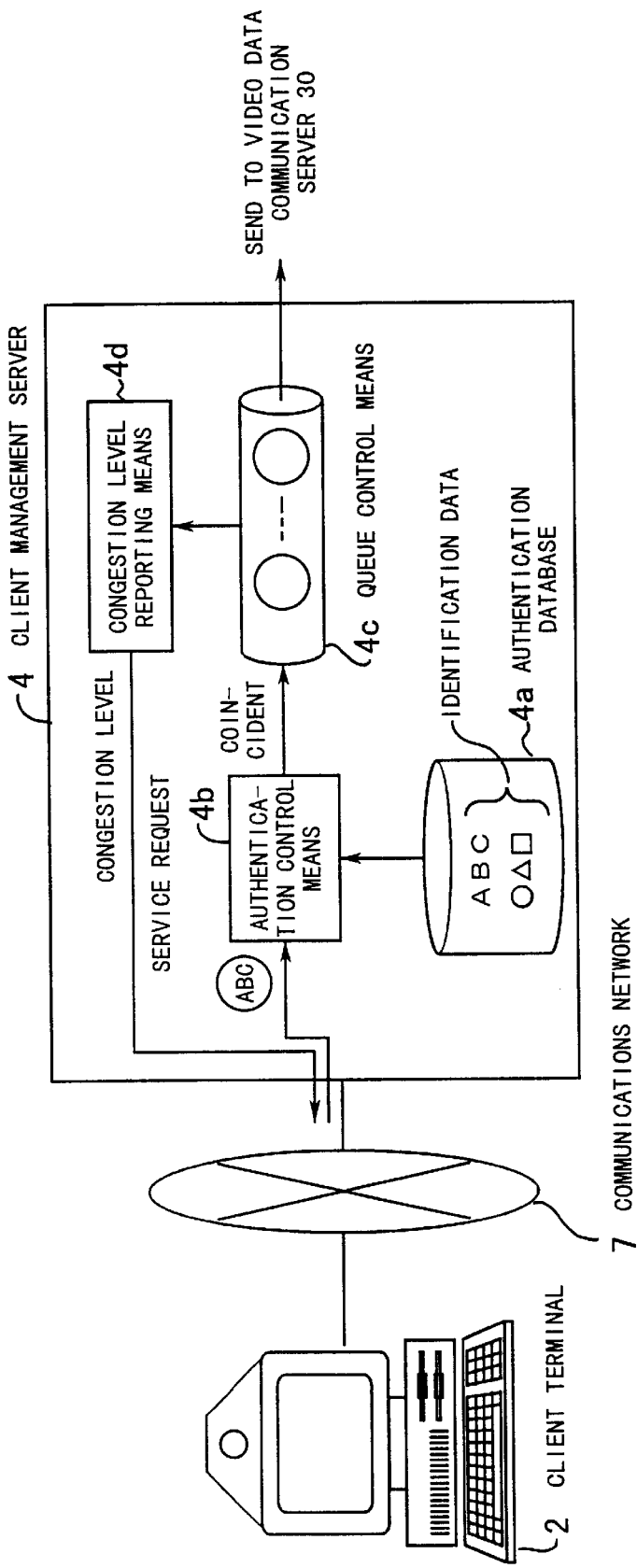
FIG. 2 is a diagram which shows the internal structure of a client management server.

Now, the following section will describe the client management server 4. FIG. 2 is a diagram which shows the internal structure of the client management server 4. The client management server 4 is responsible for the reception and management of entries of the client terminals 2a to 2n.

When accepting service requests from the client terminals 2a to 2n, the client management server 4 receives multiple service request messages and authenticates all of them, and after that, it permits one of the client terminals 2a to 2n to start a session of the bidirectional communication with the broadcast server 3 (suppose, for simplicity, that a client terminal 2 has obtained the permission). This process will be described later in more detail.

An authentication database 4a stores data to identify the client terminal 2. This identification data contains an identification number, a password, or both. An authentication control means 4b compares the identification data contained in a service request transmitted from the client terminal 2 with the identification data that has previously been stored in the authentication database 4a. When this comparison has revealed discrepancy between the two identification data, the authentication control means 4b will not accept the entry of that requesting client. When, in turn, the two identification data coincide with each other, the authentication control means 4b accepts the entry of the client.

A queue control means 4c performs queuing control, accepting each service request from the client terminal 2 as a new data element that should be entered to a waiting list, or a queue. Here, the data elements are entered and retrieved to/from the queue in a first-in first-out (FIFO) fashion. Note that the queue control means 4c only receives service requests from such a client terminal 2 whose identity has been authenticated by the authentication control means 4b, and thus it processes those qualified data elements only. The data elements retrieved from the queue are then delivered to the video data communication server 30.

When the client wishes to start a session of bidirectional communication at a particular point in time, the client terminal 2 will specify the desired start time in its service request message. If this is the case, the queue control means 4c controls the queue on the basis of that specified start time after the authentication is finished.

A congestion level reporting means 4d notifies the client terminal 2 of the level of queue congestion, i.e., how much the queue is occupied by pending data elements. As the number of subscribers, such as the client terminal 2, increases, the bidirectional communication service between the broadcast server 3 and those subscribers will be exposed to high traffic demands. In such a case, the client management server 4 can reduce the workloads by controlling the reception of service requests from client terminals including the client terminal 2.

Figure 3:
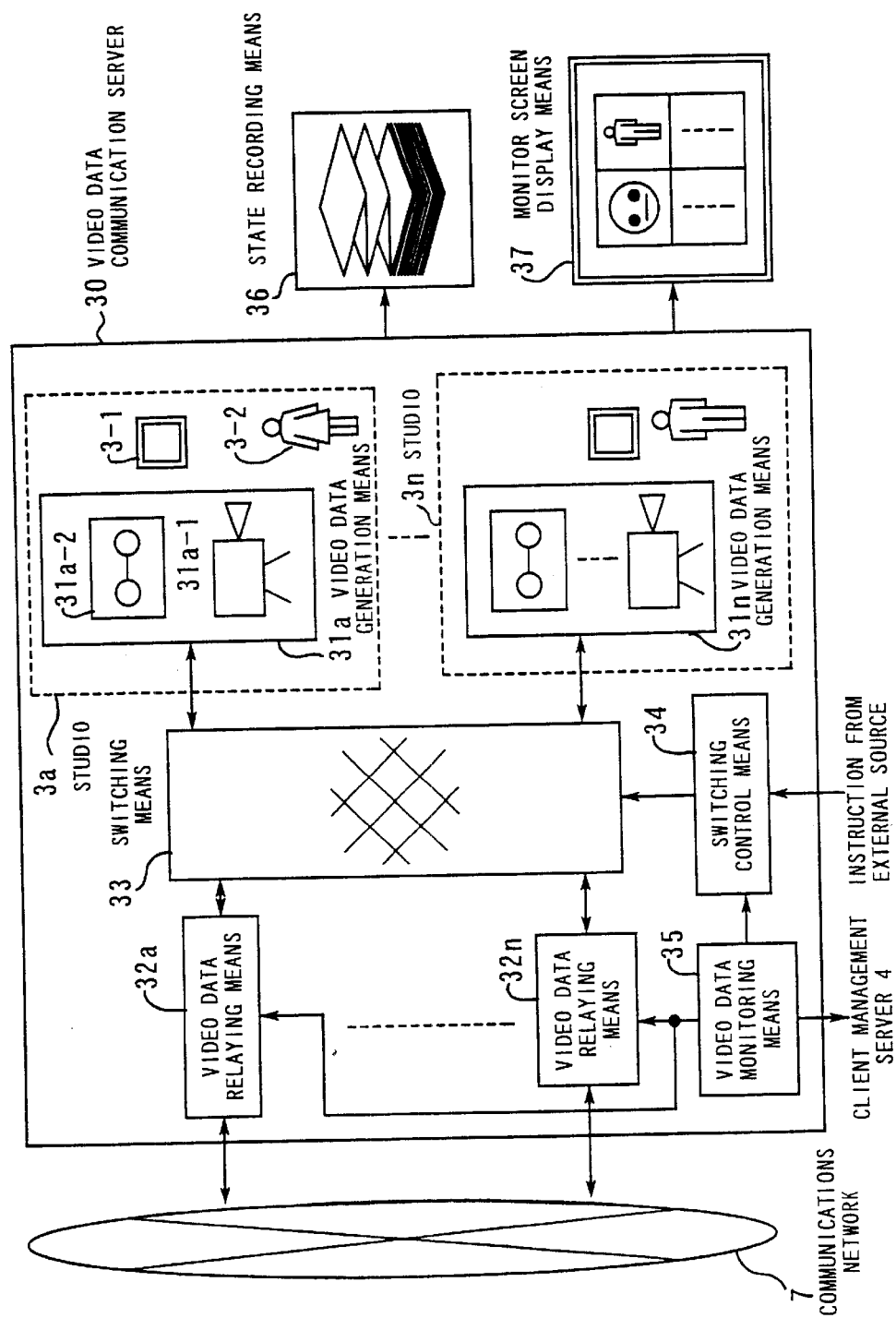
FIG. 3 is a diagram which shows the internal structure of a video data communication server.

The following section will now describe the video data communication server 30. FIG. 3 is a diagram which shows the internal structure of the video data communication server 30. This server 30, being employed as part of the broadcast server 3, has a link to the communications network 7. It controls the transmission and reception of video information between the studios 3a to 3n and the client terminal 2. In addition, the video data communication server 30 can make a callback in response to a service request message from the client terminal 2 to initiate a session of bidirectional communication. The details of this callback operation will be described later.

The video data communication server 30 comprises: a plurality of video data generation means 31a to 31n, a plurality of video data relaying means 32a to 32n, a switching means 33, a switching control means 34, and a video data monitoring means 35. The video data generation means 31a to 31n are disposed in the studios 3a to 3n, respectively, and produce a single or multiple video data streams in each studio. More specifically, each of the video data generation means 31a to 31n includes a studio camera 31a-1 and a video tape recorder 31a-2, and other studio equipment. The video data generation means 31a to 31n can also provide the client terminals 2 with prerecorded visual information during a broadcast program, replaying it from an appropriate recording medium (not illustrated). Further, the video data generation means 31a to 31n are each capable of outputting multiple video data streams, including images captured by the studio camera 31a-1 and videos replayed from the video tape recorder 31a-2.

The video data relaying means 32a to 32n relay the video information generated in the client terminals 2 and the studios 3a to 3n, simultaneously in both directions. The switching means 33 switches the connections between the plurality of video data generation means 31a to 31n and the plurality of video data relaying means 32a to 32n. The switching control means 34 controls this switching process according to the instructions from the video data monitoring means 35 (described later) and/or those from an external source. Here, the instructions from an external source may include screen switching commands that the speaker 3-2 enters through the operating console of the studio monitor 3-1, and the address information of requesting client terminals informed from the client management server 4.

Suppose, for example, that the video data relaying means 32n and the studio 3a are being connected by the switching means 33. When the present session is terminated, a new connection is subsequently made between another video data relaying means 32n and the same studio 3a. The switching control means 35 performs this kind of switching control process.

The video data monitoring means 35 monitors the operation of each video data relaying means 32a to 32n, and reports their activity status to the client management server 4 as well as to the switching control means 34. More specifically, when a video data relaying means is found to be idle, the video data monitoring means 35 notifies the switching control means 34 of the presence of such an inactive unit, thus allowing the switching control means 34 to connect it to a studio, if there is a pending request.

Besides having the above-described elements as its integral part, the video data communication server 30 has links to a state recording means 36 and a monitor screen display means 37. During a bidirectional communication session between the client terminal 2 and the broadcast server 3, the state recording means 36 records a series of operations that have been performed for each call, from its setup to termination. More specifically, the record includes internal state information such as the contents of broadcast programs, data about clients who used the bidirectional communication service, timestamp, and data for toll billing.

The monitor screen display means 37 receives all or part of the video data being relayed by the video data relaying means 32a to 32n, and it combines them into a single monitor screen for display purposes. Although the state recording means 36 and monitor screen display means 37 are illustrated as peripheral devices of the video data communication server 30, they can be integrated into the video data communication server 30. Also, the state recording means 36 and monitor screen display means 37 can be employed in each individual studio 3a to 3n.

Figure 4:
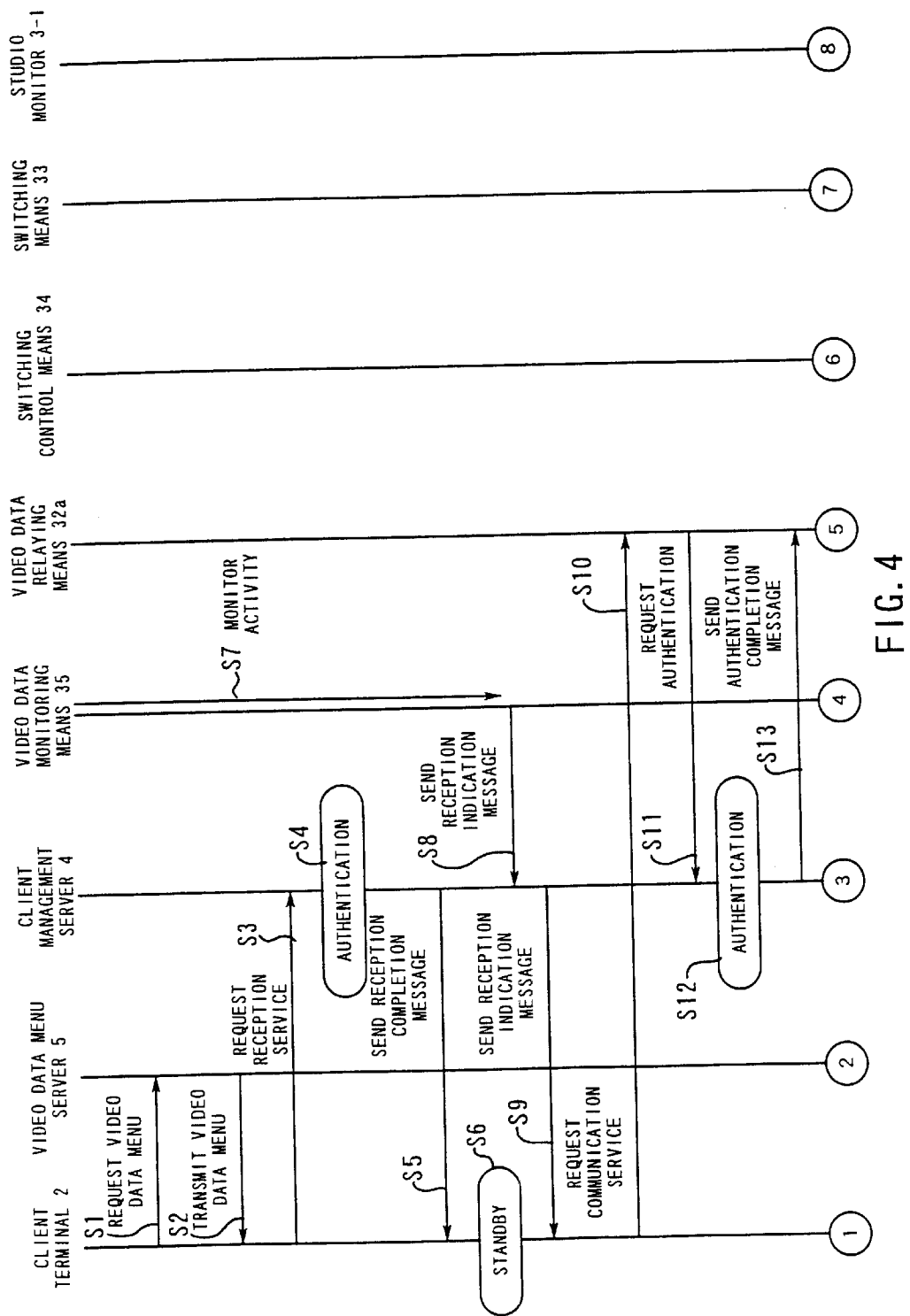
FIG. 4 is a sequence diagram which shows an operation sequence of the bidirectional communication system.
Figure 5:
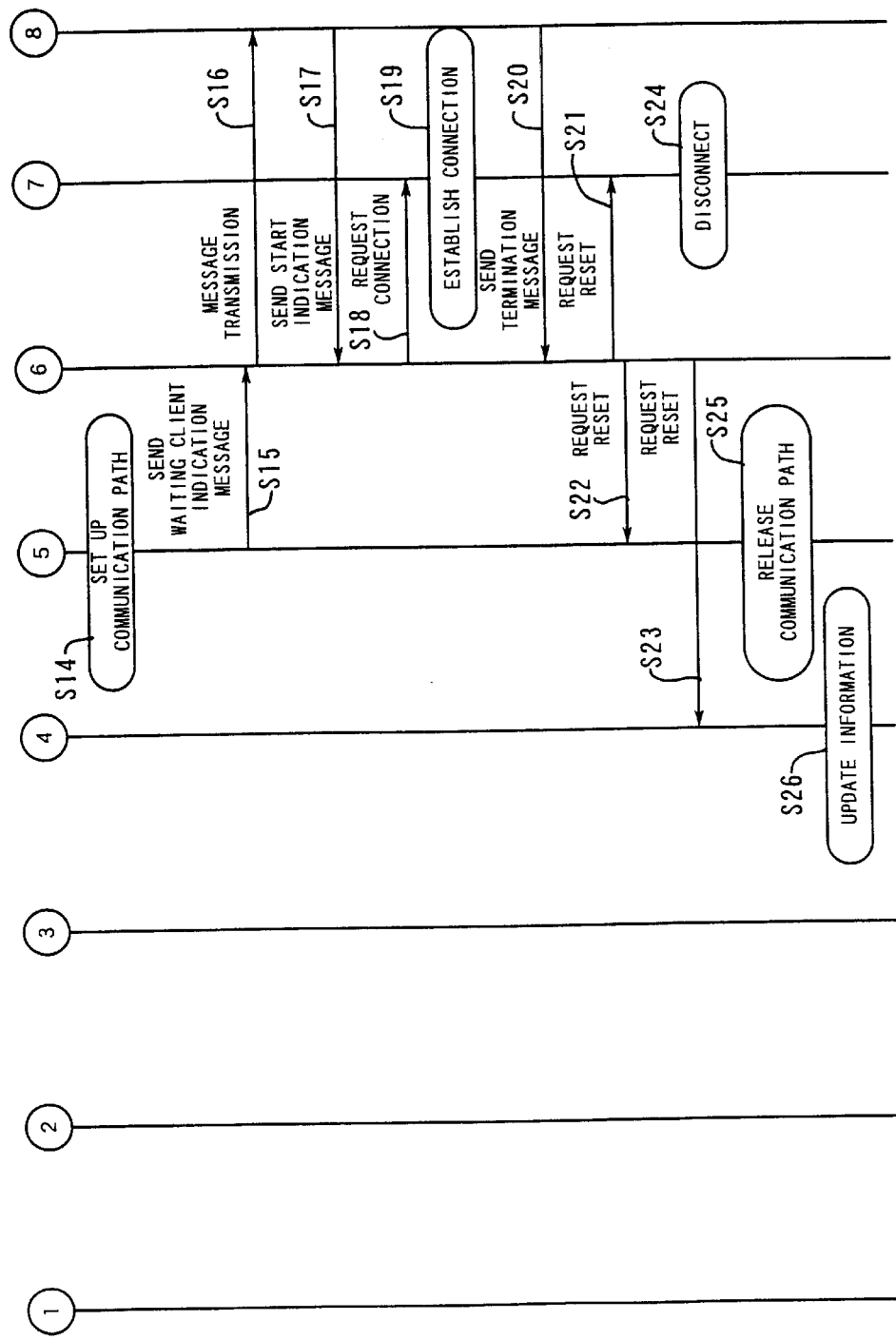
FIG. 5 is a sequence diagram which shows an operation sequence of the bidirectional communication system.

Now, the following paragraphs will present the detailed operation of the bidirectional communication system 1. FIGS. 4 and 5 are sequence diagrams which show an operation sequence of the bidirectional communication system 1. In the following explanation, it is supposed that the client terminal 2 is attempting bidirectional communication with the studio 3a.

(S1) The client terminal 2 requests the video data menu server 5 to send a video data menu.

(S2) The video data menu server 5 provides for a hypertext menu containing a list of broadcast programs and the like. It sends this menu to the client terminal 2 as the requested video data menu.

(S3) The client terminal 2 transmits a reception service request message to the client management server 4, as a first service request message.

(S4) Upon receipt of the reception service request message, the client management server 4 executes an authentication process to test whether the requesting client is really who he/she claims to be. When it failed to verify the identity, the authentication control means 4b rejects the entry of that client. When, in turn, the client's identity has successfully been verified, the authentication control means 4b puts a new entry into the queue in chronological order, based on the address information contained in the reception service request.

(S5) The client management server 4 sends a reception completion message to the client terminal 2.

(S6) The client terminal 2 enters a standby state.

(S7) The video data monitoring means 35 is monitoring the activity of the video data relaying means 32a to 32n.

(S8) The video data monitoring means 35 checks whether the video data relaying means 32a to 32n are active (i.e., they have an established connection, path, or session with a client terminal via the communications network 7) or not. If any inactive unit is found, the video data monitoring means 35 sends to the client management server 4 a reception indication message containing the address of that inactive video data relaying means. For explanatory purposes, it is supposed here that the video data relaying means 32a is found inactive.

(S9) When this reception indication message is received, the client management server 4 retrieves the oldest address information from the queue. (In the present case, it is the address of the client terminal 2). Subsequently, the client management server 4 transfers the reception indication message to the client terminal 2.

(S10) The client terminal 2 receives the reception indication message, and recognizes the address of the video data relaying means 32a from the received message. Then it transmits a communication service request message to the video data relaying means 32a as a second service request message.

(S11) Upon receipt of the communication service request message, the video data relaying means 32a obtains identification data out of the message. It then composes an authentication request message containing this identification data, and transmits the request message to the client management server 4.

(S12) The client management server 4 receives the authentication request message and performs an authentication process to test whether the requesting client is really who he/she claims to be.

(S13) The client management server 4 would deny the client's entry at this point, when it was unable to authenticate his/her identity. When in turn the identity of the requesting client is verified, the client management server 4 informs the video data relaying means 32a of that result.

(S14) Upon receipt of the authentication completion message, the video data relaying means 32a sets up a call to the remote client terminal 2 through the communications network 7. A bidirectional communication path is thus established between the client terminal 2 and the video data relaying means 32a.

(S15) The video data relaying means 32a transmits a waiting client indication message to the switching control means 34 through the video data monitoring means 35 to indicate that there is a client waiting a telephone call.

(S16) When the waiting client indication message is received, the switching control means 34 displays an appropriate message (e.g., a caption consisting of character strings and/or symbols) on the studio monitor 3-1 to indicate the reception. This makes the speaker 3-2 notice the presence of a waiting listener who desires to talk to the speaker 3-2.

(S17) To initiate a talk with the listener, the speaker 3-2 operates the studio monitor 3-1. The studio monitor 3-1 then generates a start indication message, and transmits it to the switching control means 34.

(S18) The switching control means 34 receives this start indication message as an external instruction, and it transmits a connection request message to the switching means 33 in an attempt to reach a relevant video data relaying means 32a.

(S19) Upon receipt of the connection request message, the switching means 33 connects the video data relaying means 32a to voice, video, and other input and output terminals of the facilities in the video data generation means 3a. In this way, the listener and broadcast station be gin to communicate with each other.

(S20) At the end of the conversation with the listener, the speaker 3-2 operates the studio monitor 3-1 to terminate the session. The studio monitor 3-1 generates a termination message and transmits it to the switching control means 34.

(S21, S22, S23) The switching control means 34 receives this termination message as an external instruction, and it transmits a reset request message to the switching means 33, video data relaying means 32a, and video data monitoring means 35.

(S24) Upon receipt of the reset request message, the switching means 33 releases the connection between the video data relaying means 32a and the video data generation means 31a.

(S25) Upon receipt of the reset request, the video data relaying means 32a releases the communication path (i.e., path and session) that has been established to reach the remote client terminals 2.

(S26) Upon receipt of the reset request, the video data monitoring means 35 updates the information on of inactive video data relaying means.

As described above, the bidirectional communication system 1 of the present invention is configured to permit video information to be transferred in two ways by employing the following elements: the client terminal 2 which requests the system to provide services, the client management server 4 which authenticates the clients, and the broadcast server 3 which controls the transmission and reception of video information to/from a remote client terminal. This system can provide a wide variety of communication services to meet the needs of broadcast audiences.

Further, according to the present invention, the bidirectional communication can be initiated, only when both a reception service request and a communication service request from the client terminal 2 have been successfully authorized. Therefore, a high security level is maintained to protect the system against access from unauthorized clients. In certain circumstances, however, the authentication process may only be applied to either a reception service request or a communication service request.

Now, the next paragraphs will explain another instance of bidirectional communication services, which is initiated by a callback operation made in response to a service request from a client terminal 2. Here, the "callback" is a special way of telephone communication, where a client abandons his/her call attempt after sending ringing tones and then the called party calls him/her back.

Figure 6:
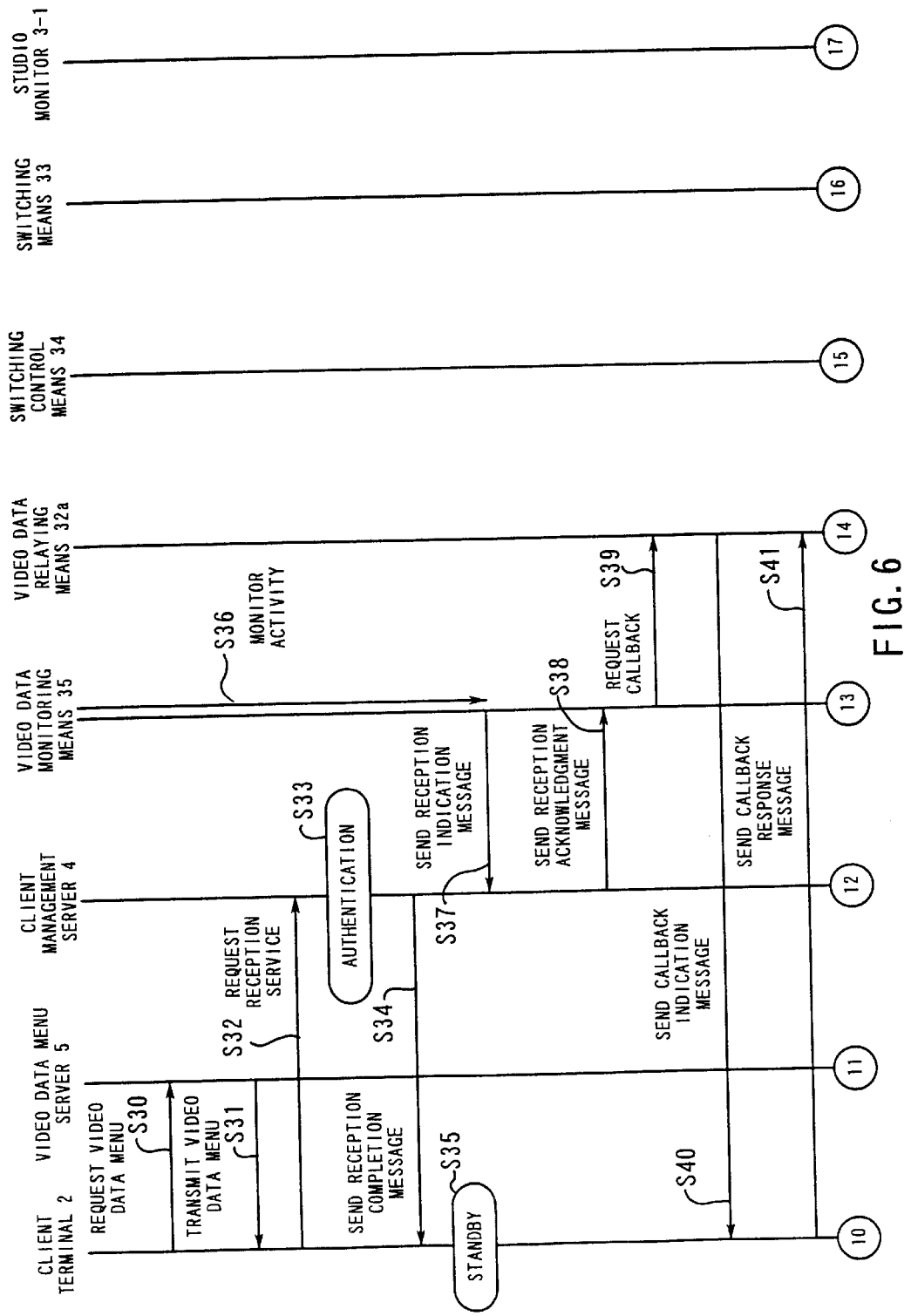
FIG. 6 is a sequence diagram which shows an operation sequence of a bidirectional communication system in which a callback function is implemented.
Figure 7:
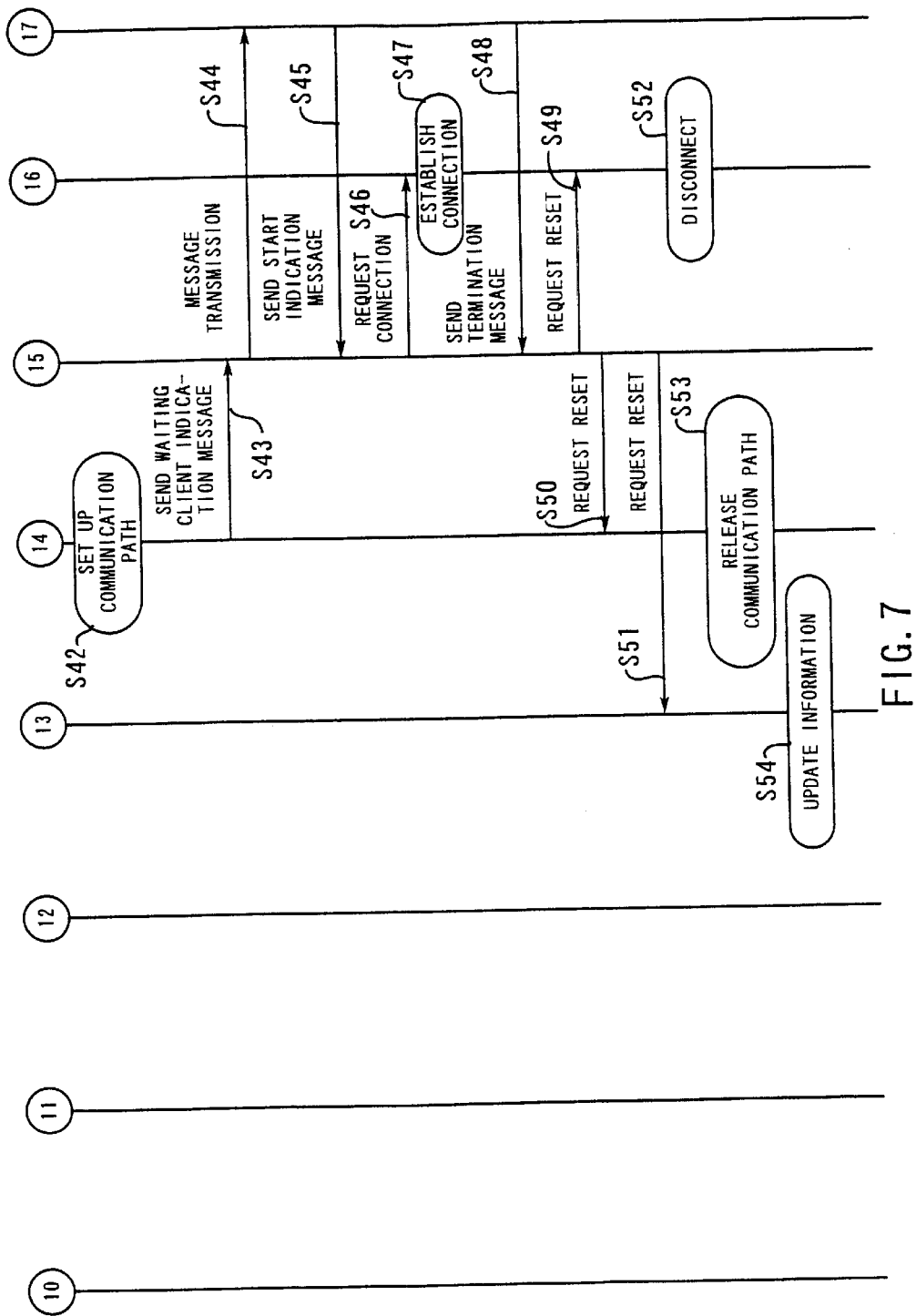
FIG. 7 is a sequence diagram which shows an operation sequence of the bidirectional communication system in which a callback function is implemented.

FIGS. 6 and 7 are sequence diagrams which show an operation sequence of the bidirectional communication system 1 with callback functions. For illustrative purposes, the following explanation assumes that the client terminal 2 is attempting a session of bidirectional communication with the studio 3a.

(S30) The client terminal 2 requests the video data menu server 5 to supply a video data menu.

(S31) The video data menu server 5 has a hypertext menu containing a list of broadcast programs and the like. The video data menu server 5 sends this menu to the client terminal 2 as the requested video data menu.

(S32) The client terminal 2 transmits a reception service request message to the client management server 4, as a first service request message.

(S33) Upon receipt of the reception service request message, the client management server 4 executes an authentication process to test whether the requesting client is really who he/she claims to be. When it failed to verify the identity, the authentication control means 4b rejects the entry of that client. When, in turn, his/her identity has successfully been verified, the authentication control means 4b puts a new entry into the queue in chronological order, based on the address information contained in the reception service request.

(S34) The client management server 4 sends a reception completion message to the client terminal 2.

(S35) The client terminal 2 enters a standby state, waiting for a callback indication message.

(S36) The video data monitoring means 35 is monitoring the activity of the video data relaying means 32a to 32n.

(S37) The video data monitoring means 35 checks whether the video data relaying means 32a to 32n are active (i.e., they have an established connection, path, or session with a client terminal via the communications network 7) or not. If any inactive unit is found, the video data monitoring means 35 sends to the client management server 4 a reception indication message containing the address of that inactive video data relaying means. Suppose, for instance, that the video data relaying means 32a is found inactive.

(S38) When this reception indication message is received, the client management server 4 retrieves the oldest entry from the queue, thereby obtaining the address information of the client terminal 2. It then transmits to the video data monitoring means 35 a reception acknowledgment message containing the address.

(S39) The video data monitoring means 35 sends a callback request message to the video data relaying means 32a, which is found inactive.

(S40) When the callback request message is received, the video data relaying means 32a recognizes the address of the client terminal 2 from the received message and returns a callback indication message to the client terminal 2.

(S41) Upon receipt of the callback indication message, the client terminal 2 returns a callback response message (including identification data) to the video data relaying means 32a.

(S42) When the callback response message is received, the video data relaying means 32a sets up a call to the remote client terminal 2 through the communications network 7. A two-way communication path is now established between the client terminal 2 and the video data relaying means 32a.

(S43) The video data relaying means 32a transmits a waiting client indication message to the switching control means 34 through the video data monitoring means 35 to indicate that there is a client who is waiting for a call.

(S44) When the waiting client indication message is received, the switching control means 34 displays an appropriate message (e.g., a caption consisting of character strings and/or symbols) on the studio monitor 3-1 to indicate the reception. This makes the speaker 3-2 notice the presence of a waiting listener who desires to talk to the speaker 3-2.

(S45) To initiate a talk with the listener, the speaker 3-2 operates the studio monitor 3-1. The studio monitor 3-1 then generates a start indication message, and transmits it to the switching control means 34.

(S46) The switching control means 34 receives this start indication message as an external instruction. It then transmits a connection request message to the switching means 33 in an attempt to reach a relevant video data relaying means 32a.

(S47) Upon receipt of the connection request message, the switching means 33 connects the video data relaying means 32a to the voice, video, and other input and output terminals of the facilities in the video data generation means 31a. In this way, the listener and broadcast station begin to communicate with each other.

(S48) At the end of the conversation with the listener, the speaker 3-2 operates the studio monitor 3-1 to terminate the session. The studio monitor 3-1 produces a termination message and transmits it to the switching control means 34.

(S49, S50, S51) The switching control means 34 receives this termination message as an external instruction, and it transmits a reset request message to the switching means 33, video data relaying means 32a, and video data monitoring means 35.

(S52) Upon receipt of the reset request message, the switching means 33 releases the connection between the video data relaying means 32a and the video data generation means 31a.

(S53) Upon receipt of the reset request message, the video data relaying means 32a releases the communication path (e.g., path and session) that has been established to reach the remote client terminal 2.

(S54) Upon receipt of the reset request message, the video data monitoring means 35 updates the information about inactive video data relaying means.

As described above, the bidirectional communication system 1 of the present invention is configured so that the client terminal 2 will use a callback service, instead of sending a communication service request message to the system, to initiate bidirectional communication. This leads to a better service for the clients, allowing them to reduce the expense for communication.

Figure 8:
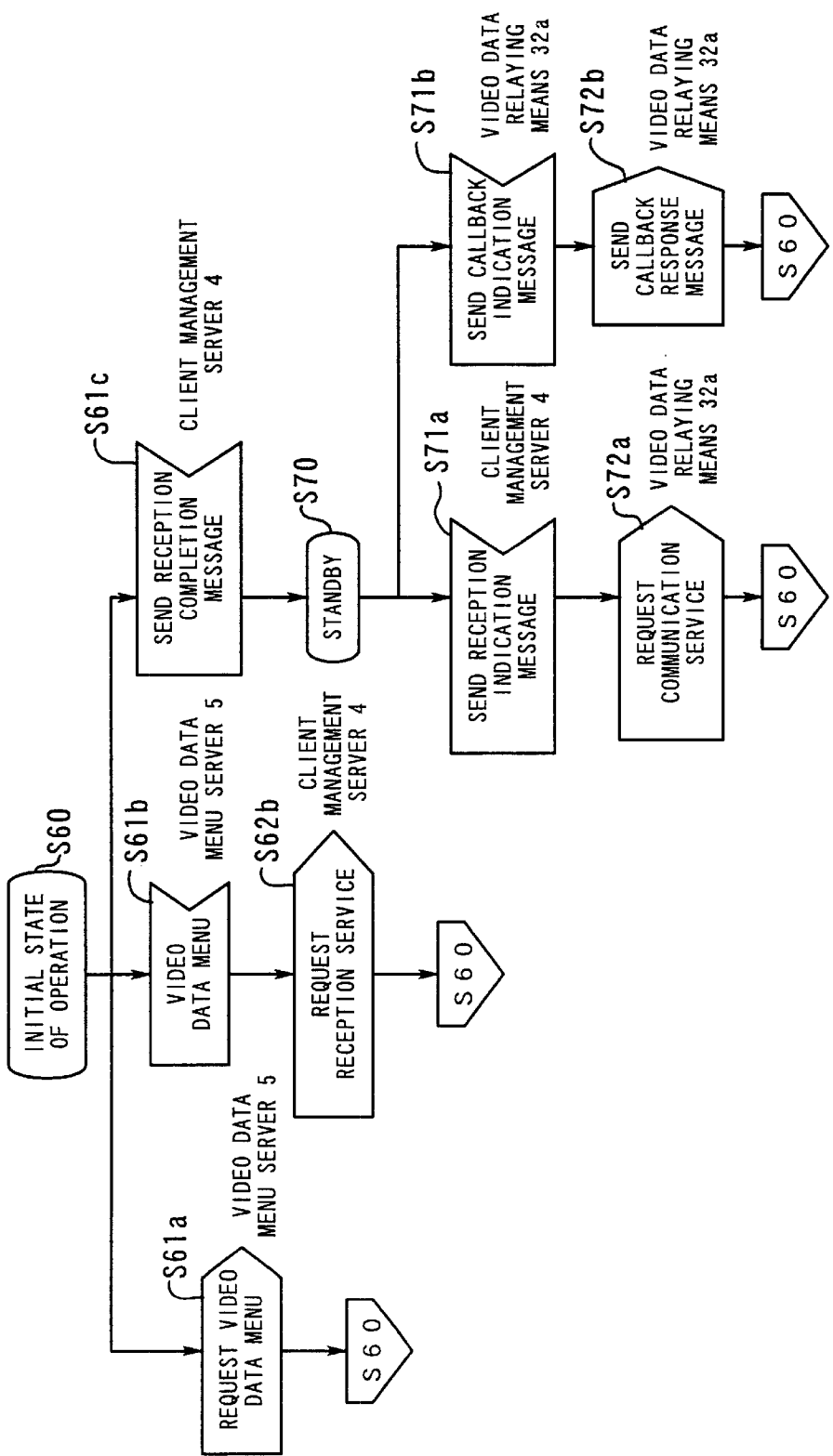
FIG. 8 is a flowchart which shows an operation sequence of a client terminal.

The following section will now describe the operation of each individual element of the system, with reference to several flowcharts written by using Specification and Description Language (SDL) symbols. FIG. 8 is a flowchart describing the operation sequence of the client terminal 2.

(S60) The client terminal 2 is in the initial state of operation.

(S61a) The client terminal 2 transmits a video data menu request message to the video data menu server 5.

(S61b) The client terminal 2 receives a video data menu from the video data menu server 5.

(S62b) The client terminal 2 transmits a reception service request message to the client management server 4.

(S61c) The client terminal 2 receives a reception completion message from the client management server 4.

(S70) The client terminal 2 is in standby state.

(S71a) The client terminal 2 receives a reception indication message from the client management server 4.

(S72a) The client terminal 2 transmits a communication service request to a video data relaying means corresponding to either one of the video data relaying means 32a to 32n. In the following explanation, it is assumed that the message has been sent to the video data relaying means 32a.

(S71b) The client terminal 2 receives a callback indication message from the video data relaying means 32a.

(S72b) The client terminal 2 transmits a callback response message to the video data relaying means 32a.

Figure 9:
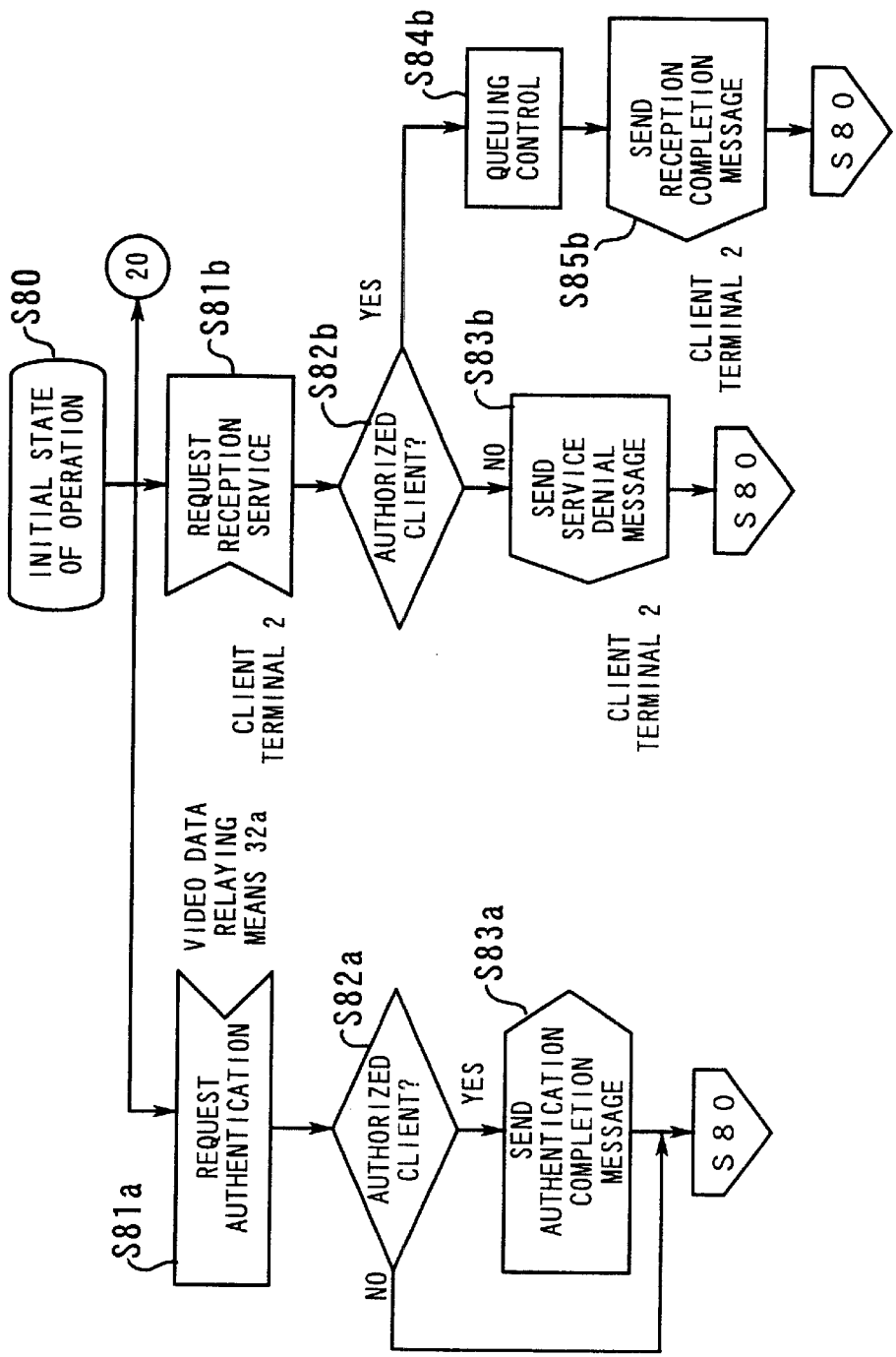
FIG. 9 is a flowchart which shows an operation sequence of a client management server.
Figure 10:
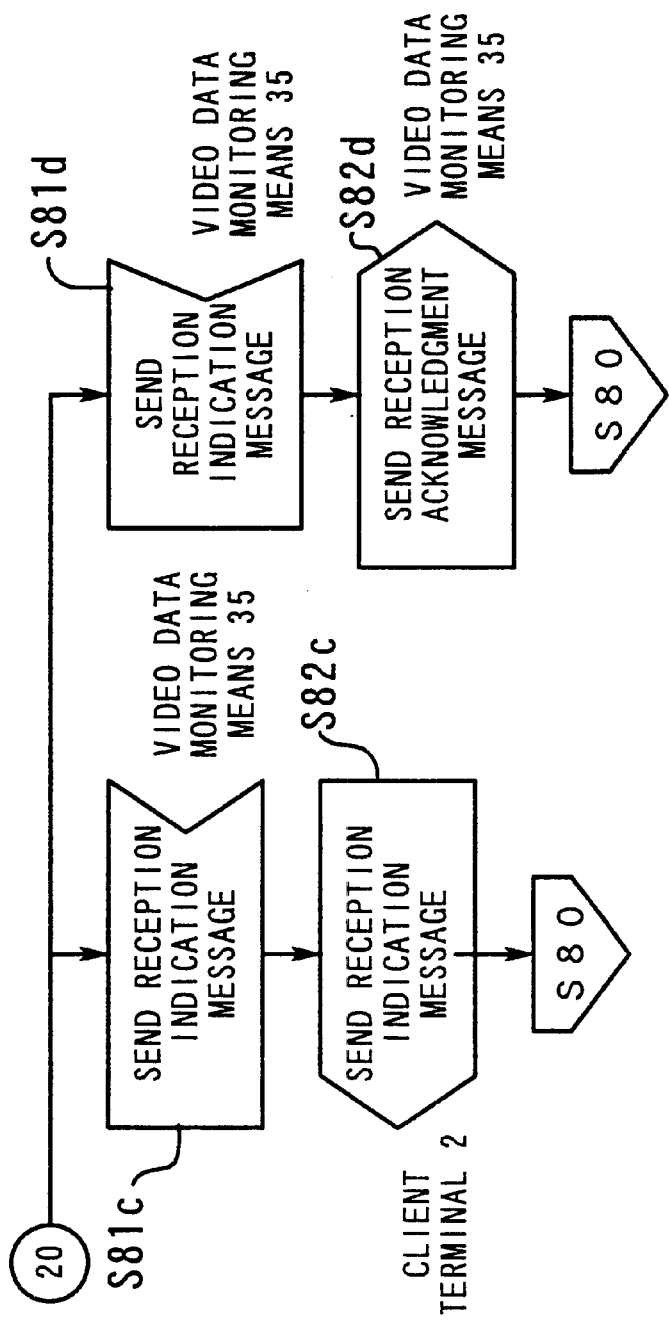
FIG. 10 is a flowchart which shows an operation sequence of the client management server.

The following section will present the operation of the client management server 4. FIGS. 9 and 10 are flowcharts describing the operation sequence of the client management server 4.

(S80) The client management server 4 is in the initial state of operation.

(S81a) The server 4 receives an authentication request from the video data relaying means 32a.

(S82a) The server 4 judges whether the requesting client is an authorized client. If the client is found to be an authorized client, the process advances to step S83a. Otherwise, the process returns to step S80.

(S83a) The server 4 transmits an authentication completion message to the video data relaying means 32a.

(S81b) The server 4 receives a reception service request from the client terminal 2.

(S82b) The server 4 judges whether the requesting client is an authorized client. If the client is found to be an authorized client, the process advances to step S84*b*. Otherwise, the process goes to step S83*b*.

(S83*b*) The server 4 notifies the client terminal 2 of the denial of service.

(S84*b*) The server 4 performs a queuing control for the address sent from the client terminal 2.

(S85*b*) The server 4 transmits a reception completion message to the client terminal 2.

(S81*c*) The server 4 receives a reception indication message from the video data monitoring means 35.

(S82*c*) The server 4 transmits a reception indication message to the client terminal 2.

(S81*d*) The server 4 receives a reception indication message from the video data monitoring means 35.

(S82*d*) The server 4 transmits a reception acknowledgment message to the video data monitoring means 35.

Figure 11:
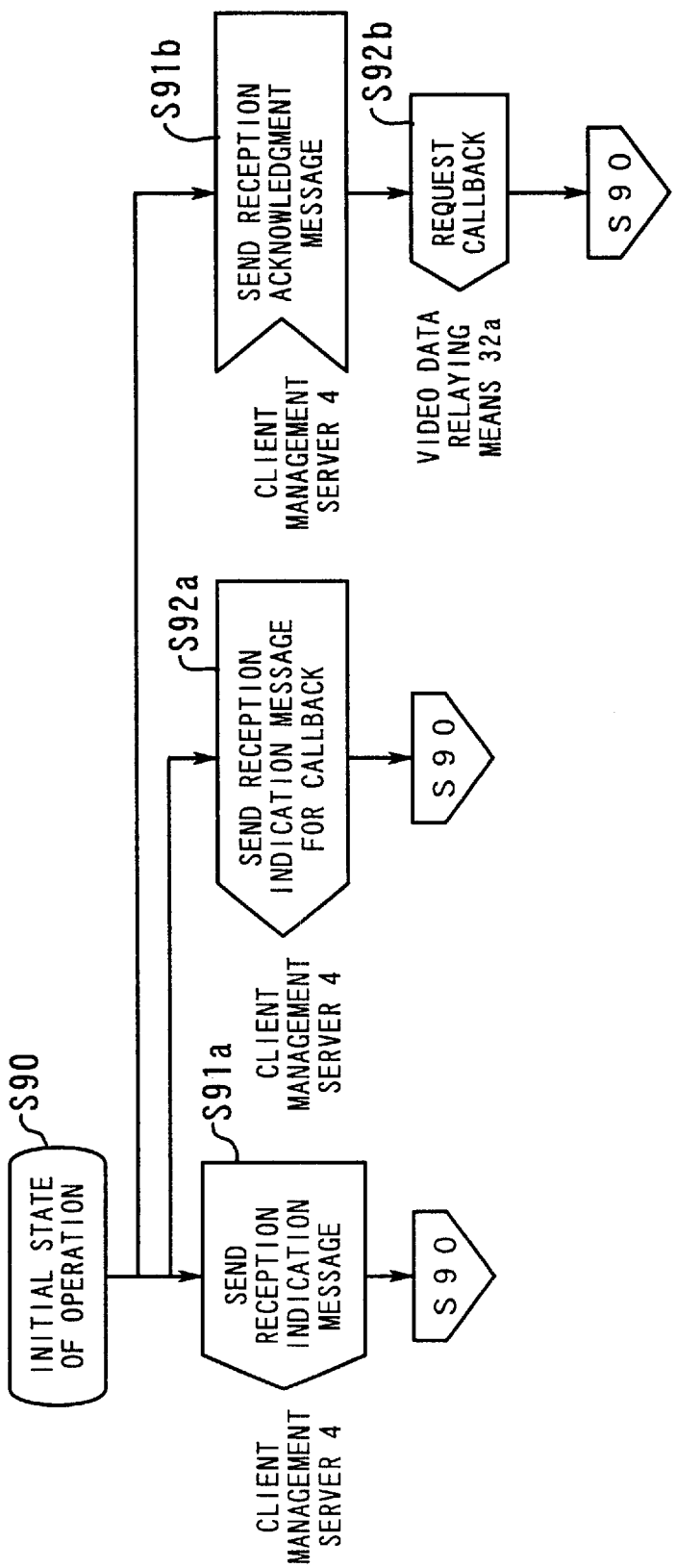
FIG. 11 is a flowchart which shows an operation sequence of a video data monitoring means.

The next section will now describe the video data monitoring means 35. FIG. 11 is a flowchart showing the operation sequence of the video data monitoring means 35.

(S90) The video data monitoring means 35 is in the initial state of operation.

(S91*a*) The means 35 transmits a reception indication message to the client management server 4.

(S92*a*) The means 35 transmits a reception indication message to the client management server 4 to enable callback.

(S91*b*) The means 35 receives a reception acknowledgment message from the client management server 4.

(S92*b*) The means 35 transmits a callback request message to the video data relaying means 32.

Figure 12:
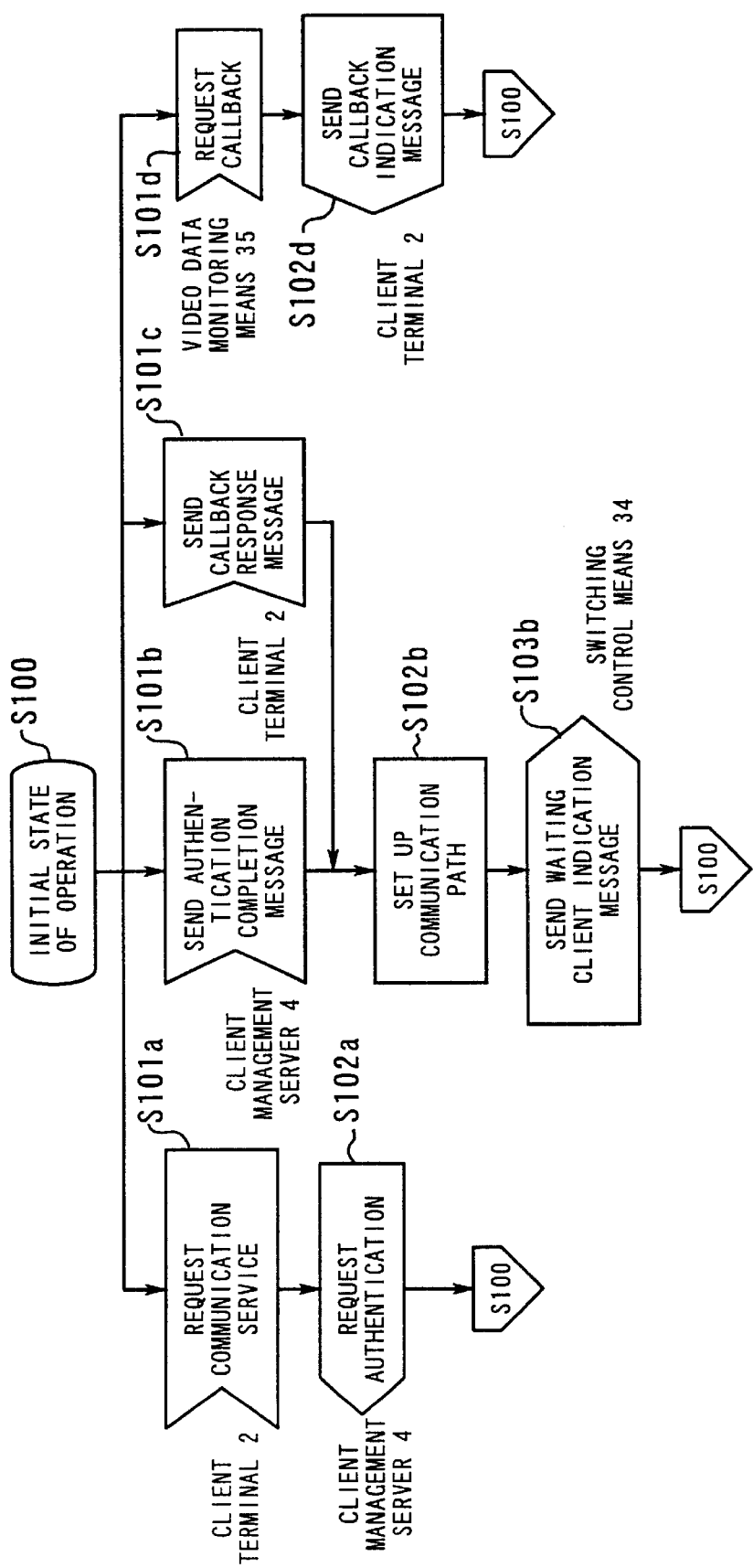
FIG. 12 is a flowchart which shows an operation sequence of the video data relaying means.

The next section will now describe the video data relaying means 32*a*. FIG. 12 is a flowchart showing the operation sequence of the video data relaying means 32*a*.

(S100) The video data relaying means 32*a* is in the initial state of operation.

(S101*a*) The means 32*a* receives a communication service request from the client terminal 2.

(S102*a*) The means 32*a* transmits an authentication request to the client management server 4.

(S101*b*) The means 32*a* receives an authentication completion message from the client management server 4.

(S102*b*) The means 32*a* sets up a communication path.

(S103*b*) The means 32*a* transmits a waiting client indication message to the switching control means 34.

(S101*c*) The means 32*a* receives a callback response message from the client terminal 2, and advances the process to step S102*b*.

(S101*d*) The means 32*a* receives a callback request message from the video data monitoring means 35.

(S102*d*) The means 32*a* transmits a callback indication message to the client terminal 2.

Figure 13:
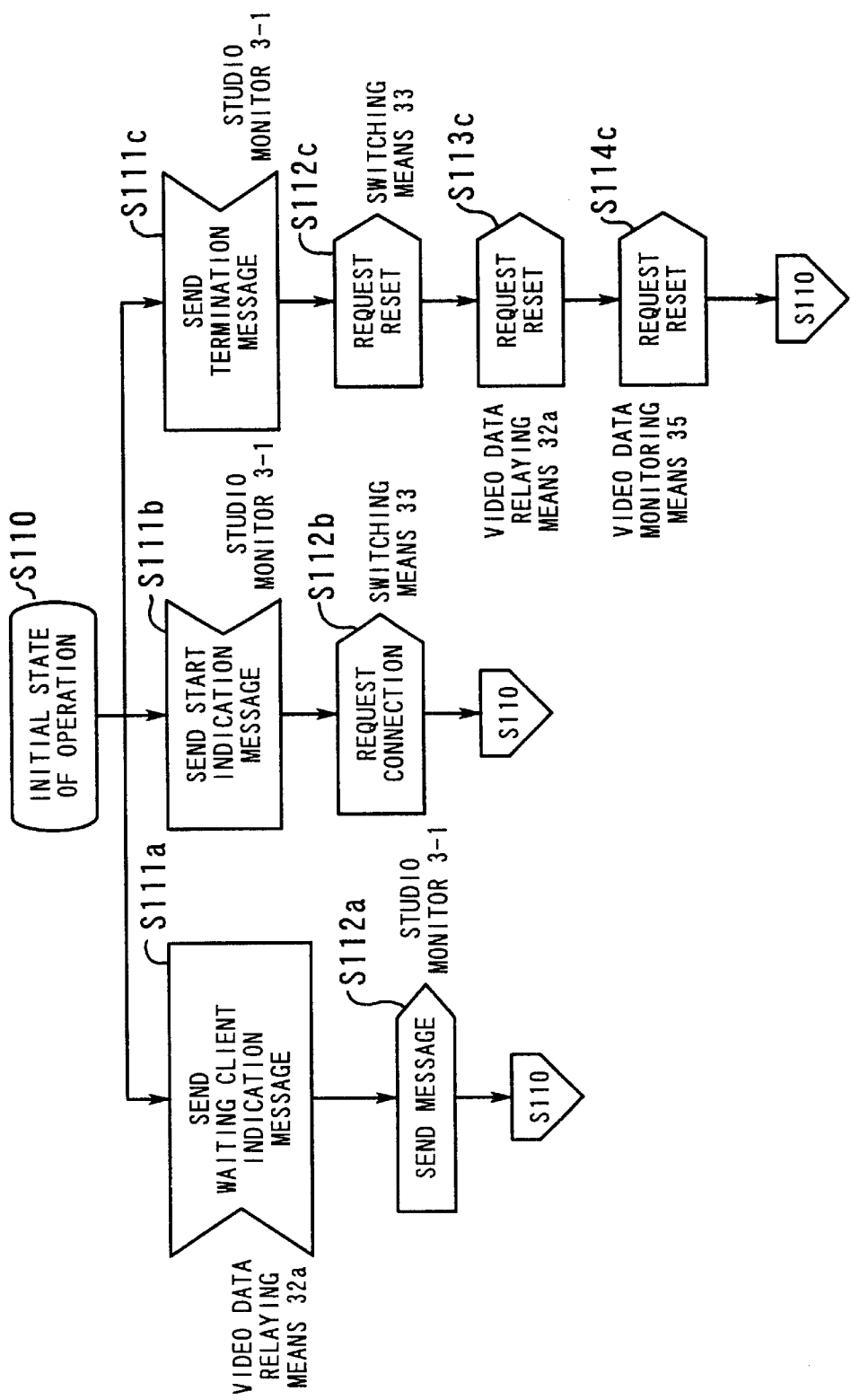
FIG. 13 is a flowchart which shows an operation sequence of a switching control means.

The next section will now describe the switching control means 34. FIG. 13 is a flowchart showing the operation sequence of the switching control means 34.

(S110) The switching control means 34 is in the initial state of operation.

(S111*a*) The means 34 receives a waiting client indication message from the video data relaying means 32*a*.

(S112*a*) The means 34 transmits a message to the studio monitor 3-1.

(S111*b*) The means 34 receives a start indication message from the studio monitor 3-1.

(S112*b*) The means 34 transmits a connection request message to the switching means 33.

(S111*c*) The means 34 receives a termination message from the studio monitor 3-1.

(S112*c*) The means 34 transmits a reset request message to the switching means 33.

(S113*c*) The means 34 transmits a reset request message to the video data relaying means 32.

(S114*c*) The means 34 transmits a reset request message to the video data monitoring means 35.

As described above, the bidirectional communication system 1 of the present invention is configured to permit video information to be transferred in two ways by employing the following elements: the client terminal 2 which requests the system to provide services, the client management server 4 to authenticate each clients' identity, and the broadcast server 3 to control the transmission and reception of video information to/from remote client terminals. Besides allowing the listeners to participate readily in a broadcast program, this system can provide a wide variety of communication services to meet their needs.

The above description has presented a system configuration where video information including image and voice data is handled. The same concept can also be applied to the bidirectional transmission of character-based information.

In summary of the above description, the bidirectional communication system of the present invention is configured to permit video information to be exchanged in two ways by employing the following elements: a client terminal which requests the system to provide services, a client management server which authenticates each client's identity, and a broadcast server which controls the transmission and reception of video information to/from remote client terminals after the authentication is finished. This system can provide a wide variety of communication services to meet the needs of broadcast audiences.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A bidirectional communication system that performs bidirectional communication of video information including image and voice data, comprising:

a plurality of client terminals, each of which transmits and receives the video information after sending a first and second service request messages over a communications network and having been granted authorization through a first and second authentication processes for the first and second service request messages, respectively;

a broadcast server comprising a video data communication server to transmit and receive the video information to and from the client terminal of a requesting client whose identity has been successfully authenticated through the second authentication process, the video data communication server initiating the second authentication process by sending an authentication request message over the communication network in response to the second service request from the requesting client terminal; and a client management server to perform the first authentication process in response to the first service request message from the requesting client terminal, and to perform the second authentication process in response to the authentication request message from the video data communication server.

2. The bidirectional communication system according to claim 1, wherein said client management server informs said plurality of client terminals of congestion level of the service request messages that have been received from said plurality of client terminals.

3. The bidirectional communication system according to claim 1, wherein said client management server reduces workloads thereof by controlling the service request messages coming from said plurality of client terminals, when said plurality of client terminals and said broadcast server are exposed to high traffic demands.

4. The bidirectional communication system according to claim 1, wherein said broadcast server begins a session of the bidirectional communication after making a callback operation in response to each service request message from the client terminals.

5. The bidirectional communication system according to claim 1, further comprising state recording means for recording a series of state information during a session, from setup to termination, of the bidirectional communication with the client terminals.

6. The bidirectional communication system according to claim 1, further comprising a video data menu server which provides said plurality of client terminals with a video data menu concerning the video information.

7. The bidirectional communication system according to claim 1, wherein said client management server comprises queue control means for creating a queue and performing queuing control to handle the service request messages sent from said plurality of client terminals.

8. The bidirectional communication system according to claim 7, wherein said queue control means only accepts the service request messages from such client terminals whose identity has been successfully authenticated, and controls the accepted service request messages by using the queue.

9. The bidirectional communication system according to claim 1, wherein said client terminals put start time information into the service request messages, to specify when to start the bidirectional communication with the video data communication server.

10. The bidirectional communication system according to claim 9, wherein said queue control means performs the queuing control according to the start time information.

11. The bidirectional communication system according to claim 1, wherein said video data communication server comprises:
   a plurality of video data generation means, disposed in each studio in said broadcast server, for generating the video information;
   a plurality of video data relaying means for relaying the video information to said plurality of client terminals;
   switching means for switching connections between said plurality of video data generation means and said plurality of video data relaying means; and
   switching control means for controlling said switching of the connections.

12. The bidirectional communication system according to claim 11, wherein said video data communication server further comprises video data monitoring means for monitoring activity of said plurality of video data relaying means.

13. The bidirectional communication system according to claim 11, said broadcast server further comprises monitor image display means for producing and displaying a monitor image by combining part or all of the video information relayed through said plurality of video data relaying means.

14. The bidirectional communication system according to claim 1, further comprising a toll billing server which starts accumulation of a toll when a communication session of each client terminal is started, and ends the accumulation when the communication session is closed.

15. The bidirectional communication system according to claim 14, wherein said toll billing server issues tickets having identification data to said client terminals.

16. The bidirectional communication system of claim 1, wherein the video data communication server comprises a plurality of video data relay means for relaying the video information to and from the client terminals, and wherein the client management server allocates one of the plurality of video data relaying means to the requesting client terminal in response to the first service request message received therefrom.

17. The bidirectional communication system of claim 1, wherein the video data communication server comprises a plurality of video data relaying means for relaying the video information to and from the client terminals, and wherein the requesting client terminal addresses the second service request message to one of the plurality of video data relaying means that is specified by the client management server.

18. A client terminal, for use by a requesting client whose identification data is stored in a client management server, which performs bidirectional communication with a broadcast server to deliver video information including image and voice data, wherein the client terminal transmits a first service request message to the client management server to initiate a first authentication process therein, wherein the client terminal transmits a second service request message that causes the broadcast server to initiate a second authentication process in the client management server, and wherein the client terminal transmits and receives the video information when the first and second authentication processes have successfully authenticated the identity of the requesting client.

19. A client management server which manages clients in a bidirectional communication system where video information including image and voice data is delivered from a video data communication server in a broadcast server to a plurality of client terminals and vice versa, comprising:
   an authentication unit that performs a first authentication process in response to a first service request message from the client terminal of a requesting client, and a second authentication process in response to an authentication request message that the video data communication server transmits in response to a second service request message from the requesting client terminal, thereby permitting the requesting client terminal to transmit a signal to and receive a signal from the video data communication server.

20. A broadcast server to perform, in conjunction with a client management server, bidirectional communication with a plurality of client terminals to deliver video information including image and voice data, comprising:
   a video data communication server to issue an authentication request message to the client management server in response to a second service request message from the client terminal of a requesting client, to transmit and receive the video information to and from the requesting client terminal when the client management server has successfully authenticated the requesting client in response to the authentication request message, wherein the client management server permits the requesting client terminal to send the second service request message to the video communication server only when the identity of the requesting client has been authenticated as a result of a first service request message previously sent from the requesting client terminal to the client management server.

21. A method for bidirectional communication between a client terminal and a video communication server, comprising:

transmitting a first service request to a client management server, wherein the client management server authenticates the client terminal in response to the first service request; and transmitting a second service request to the video communication server only when the identity of the requesting client terminal has been authenticated by the client management server, wherein the client management server authenticates the client terminal in response to an authentication request from the video communication server, wherein the client management server enables the client terminal to transmit and receive video information to and from the video communication server when the client management server has successfully authenticated the client terminal in response to the authentication request message.

* * * * *